(12) United States Patent
Fattic

(10) Patent No.: US 7,593,807 B2
(45) Date of Patent: Sep. 22, 2009

(54) METHOD FOR OPTIMIZING FUEL INJECTION TIMING IN A COMPRESSION IGNITION ENGINE

(75) Inventor: Gerald T. Fattic, Fishers, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 12/008,128

(22) Filed: Jan. 9, 2008

(65) Prior Publication Data
US 2009/0177368 A1 Jul. 9, 2009

(51) Int. Cl.
G06F 17/00 (2006.01)
(52) U.S. Cl. ........................ 701/105; 123/491
(58) Field of Classification Search ......... 701/103–105, 701/111–114; 123/478, 480, 299, 491; 73/114.32, 73/114.52, 114.53
See application file for complete search history.

(56) References Cited

U.S. PATENT DOCUMENTS

| 4,525,781 A | 6/1985 | Konomi | 364/999.999 |
| 5,201,296 A * | 4/1993 | Wunning et al. | 123/479 |
| 5,400,648 A | 3/1995 | Mahr | 73/115 |
| 5,485,374 A | 1/1996 | Takaku | 364/999.999 |
| 6,876,919 B2 | 4/2005 | James | 701/111 |
| 7,072,758 B2 * | 7/2006 | Kolmanovsky et al. | 701/103 |
| 7,177,751 B2 * | 2/2007 | Froloff et al. | 701/102 |
| 7,200,487 B2 * | 4/2007 | Ancimer | 701/111 |
| 7,277,790 B1 * | 10/2007 | Green et al. | 701/105 |
| 7,401,606 B2 * | 7/2008 | Lewis et al. | 123/685 |

* cited by examiner

Primary Examiner—Stephen K. Cronin
Assistant Examiner—Johnny H. Hoang
(74) Attorney, Agent, or Firm—Paul L. Marshall

(57) ABSTRACT

A method for determining the optimum fuel injection timing angle in a CI engine provided with means disposed in one or more cylinders for measuring Indicated Mean Effective Pressure. The pressure level during the power stroke of a piston is a direct correlate of engine torque being generated, and the timing of fuel injection can increase or decrease the amount of torque. Thus, maximum torque can be obtained by optimizing the timing of fuel injection. An algorithm in the ECM varies the timing of fuel injection in a narrow range until a IMEP maximum is achieved, which timing is then retained and employed until the engine operating conditions change. Thus, the invention can optimize fuel economy by optimizing the torque obtained from each injection of fuel into the cylinders.

5 Claims, 3 Drawing Sheets

METHOD FOR OPTIMIZING FUEL INJECTION TIMING IN A COMPRESSION IGNITION ENGINE

TECHNICAL FIELD

The present invention relates to compression-ignited (CI) internal combustion engines; more particularly, to methods for timing the injection of fuel into the cylinders of CI engines; and most particularly, to a method for optimizing fuel injection timing to provide maximum torque for a given amount of injected fuel.

BACKGROUND OF THE INVENTION

CI engines require injection of fuel into the cylinders during the compression stroke of each piston. The fuel is ignited when sufficient compression and temperature are achieved. Hence, the timing of fuel injection or injections into the cylinders is obviously an important parameter in engine performance and fuel efficiency.

In the prior art, fuel injection calibrations are typically performed on a dynamometer at the completion of engine assembly and are fixed in the memory of an associated Engine Control Module (ECM). The timing calibrations take into account at least engine speed, temperature, and throttle position.

With prolonged use, an engine may undergo changes in the engine itself, or in fuel properties, such that the programmed fuel injection calibrations are no longer optimum. In prior art engines, no means is provided for adjusting the calibrations to re-optimize fuel injection timing for each cylinder through the operating life of the engine.

What is needed in the art is a method for continuously re-optimizing the fuel injection timing for each cylinder in a CI engine to provide maximum torque for the amount of fuel injected.

It is a principal object of the present invention to continuously maximize the output torque of a CI engine.

SUMMARY OF THE INVENTION

Briefly described, a CI engine is provided with means, such as a pressure sensor, disposed in one or more cylinders (and preferably all cylinders) for measuring instantaneously the Indicated Mean Effective Pressure (IMEP) in the cylinder. The operating principle of the invention is that the pressure level in the cylinder during the power stroke of a piston is a direct indicator of engine torque being generated, and that the timing of fuel injection can increase or decrease the amount of torque. Thus, there is a maximum torque value which can be obtained by optimizing the timing of fuel injection. For the engine operating conditions pertaining at any time of engine operation, an algorithm in the ECM varies the timing of fuel injection in a narrow range until a IMEP maximum is achieved, which timing is then retained and employed until the engine operating conditions change. Thus, the invention maximizes the fuel economy of each cylinder by maximizing the torque obtained from each injection of fuel into the cylinders.

BRIEF DESCRIPTION OF THE DRAWINGS

The present invention will now be described, by way of example, with reference to the accompanying drawings, in which.

The exemplification set out herein illustrates one preferred embodiment of the invention, in one form, and such exemplification is not to be construed as limiting the scope of the invention in any manner.

DESCRIPTION OF THE PREFERRED EMBODIMENTS

In a method in accordance with the invention for optimizing the injection timing of fuel injectors in each cylinder of a CI engine, the engine operating parameters are checked to see if the engine is in a stable operating condition; if so, then a search routine can begin for the injection timing that produces the maximum IMEP reading for a given fueling rate.

There is a unique injection timing angle that produces the maximum IMEP, which maximum and thus angle may be found by a search algorithm. (The timing "angle" is the rotational angle of the crankshaft before top dead center of the piston in the cylinder at which fuel injection is initiated.) When the injection angle is found that produces the maximum IMEP, that angle is stored in memory. This value can be used for injection timing when the algorithm is not in search routine mode because the engine is not in steady state condition. Also, the search algorithm will help to adjust the injection timing for changes in fuel properties.

Engine speed, fueling rate, mass air flow rate, intake manifold oxygen level, manifold absolute pressure, and intake mixture temperature are checked to verify that the search routine is operating within engine steady state limits. The injection timing angle is also kept within a defined range of timing angles when the search routine is performed.

The same search routine can be used with an IMEP value reconstructed from engine speed or accelerometers. A measured engine torque or reconstructed engine torque can also be used for the search routine.

For certain operating conditions, emissions can be an important constraint when performing the IMEP search routine. A search routine can use the oxygen level in the intake manifold as a check that the engine is operating in the proper emissions area for smoke and NOx. The oxygen level can be computed from the intake mass air flow, the fueling rate, the engine speed, volumetric efficiency, and fuel compositions, as is already well known in the prior art. Alternatively, the oxygen level can be measured directly by using an oxygen sensor in the intake manifold.

The maximum cylinder pressure rise rate is checked to stay within limits to prevent excessive audible noise from the combustion process (diesel knock).

The engine load can be a computed engine torque value or an IMEP value calculated from a cylinder pressure sensor.

Within the scope of the invention, a method of the invention may employ pressure sensor means in only one cylinder of a multiple-cylinder CI engine or in a plurality (preferably all) of said cylinders. In the latter case, the method is then employed simultaneously for all of the cylinders, thereby maximizing the IMEP for each of the cylinders and thus the entire engine.

Figure 1:
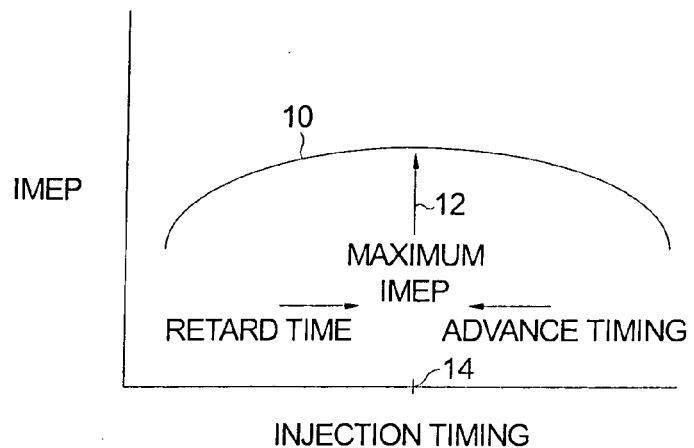
FIG. 1 is a schematic graph showing the basic method of the invention.

Referring to FIG. 1, it is seen that the IMEP in a CI engine cylinder is a function of fuel injection timing. Individual IMEP values as employed herein are defined as the highest value obtained in the power stroke of the engine cylinder and piston. IMEP curve 10 reaches a maximum value 12 at an optimum injection timing angle 14 that may be found by progressively advancing or retarding the timing while measuring the resulting IMEP, in accordance with the invention.

Measurement of IMEP in engines is well known in the prior art. See, for example, U.S. Pat. Nos. 4,525,781; 5,400,648; 5,485,374; and 6,876,919.

Figure 2:
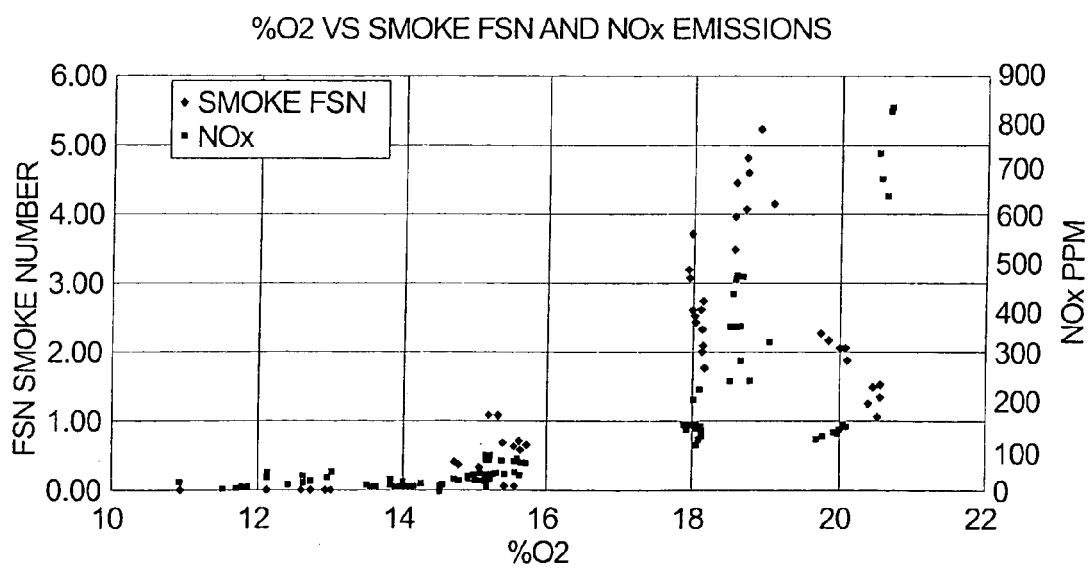
FIG. 2 is a graph showing FSN smoke and NOx emissions in diesel exhaust as a function of percent oxygen in the intake manifold.

Referring to FIG. 2, it is seen that both FSN smoke number and NOx levels in diesel exhaust are low when the percentage of oxygen in the intake manifold is lower than about 15; both pollutants are seen to increase rapidly and unpredictably with increasing oxygen percentage above about 16 (as in an intense acceleration, heavy load, or steep grade, wherein the throttle valve is wide open, the turbo charger is operating at a high level, and exhaust gas recirculation is proportionally low). The method of the present invention preferably is applied when an engine is at a relatively steady state operating condition; thus, as an example of an engine steady-state indicator, an upper limit of about 15% $O_2$ in the intake manifold is presently preferred.

Figure 3:
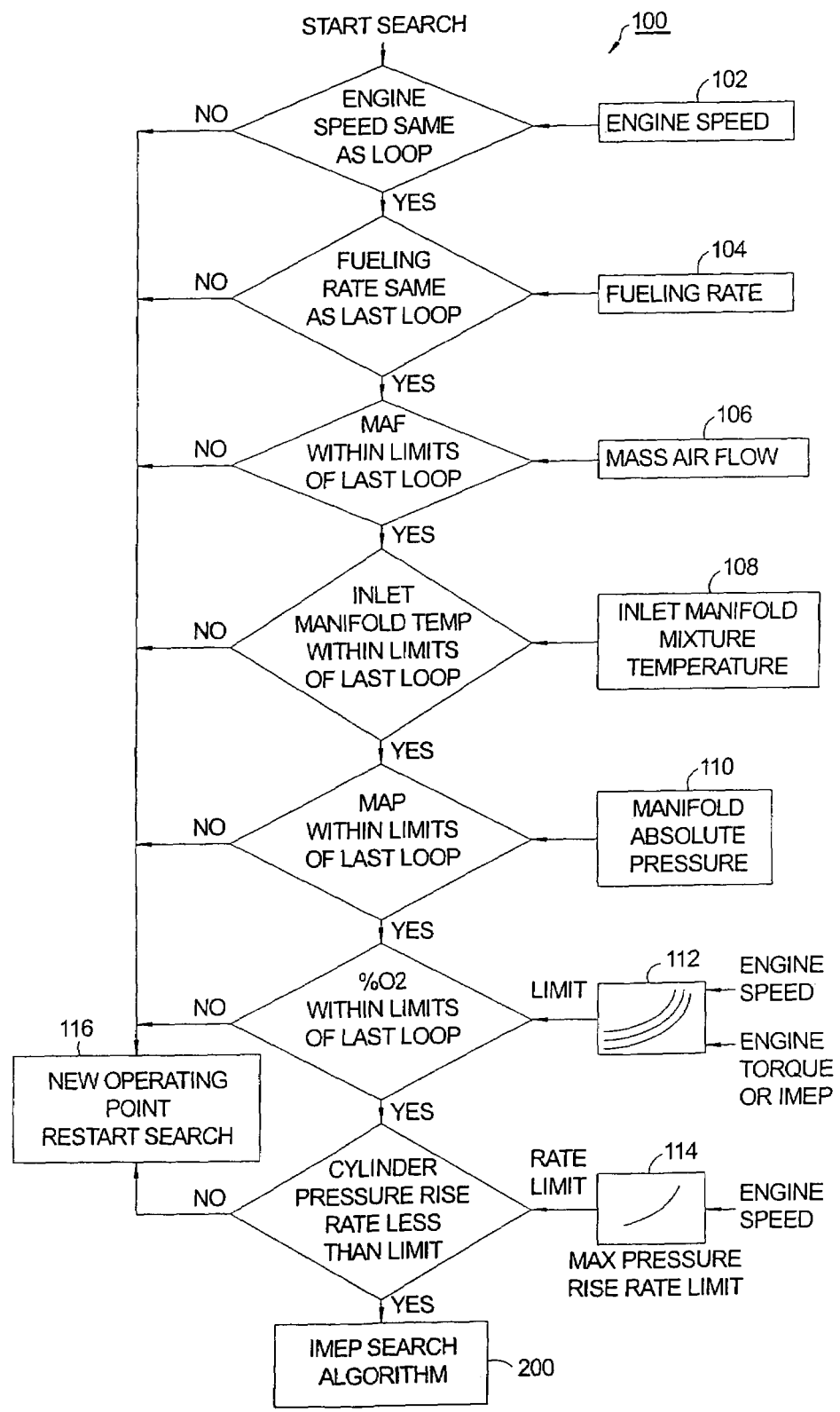
FIG. 3 is an algorithm for determining if an engine is in a steady state condition before beginning a fuel injection timing optimization routine.

Referring to FIG. 3, algorithm 100 is applied in a recurring loop for each engine cylinder to determine whether the engine is at a steady state condition. Engine speed 102, fueling rate 104, mass air flow 106, inlet manifold inlet temperature 108, and manifold absolute pressure 110 are all monitored directly by an engine ECM. Intake oxygen percentage and cylinder pressure rise rate are readily calculated from such direct inputs via look-up tables 112,114, respectively. The values obtained are retained after each loop and are the basis of comparisons in the next succeeding loop. If any one of these parameters has changed beyond predetermined limits, the engine is judged to not be in a steady state condition and the search is restarted 116 in another loop. If all these parameters are within their predetermined limits, an IMEP search routine algorithm 200 is authorized.

Figure 4:
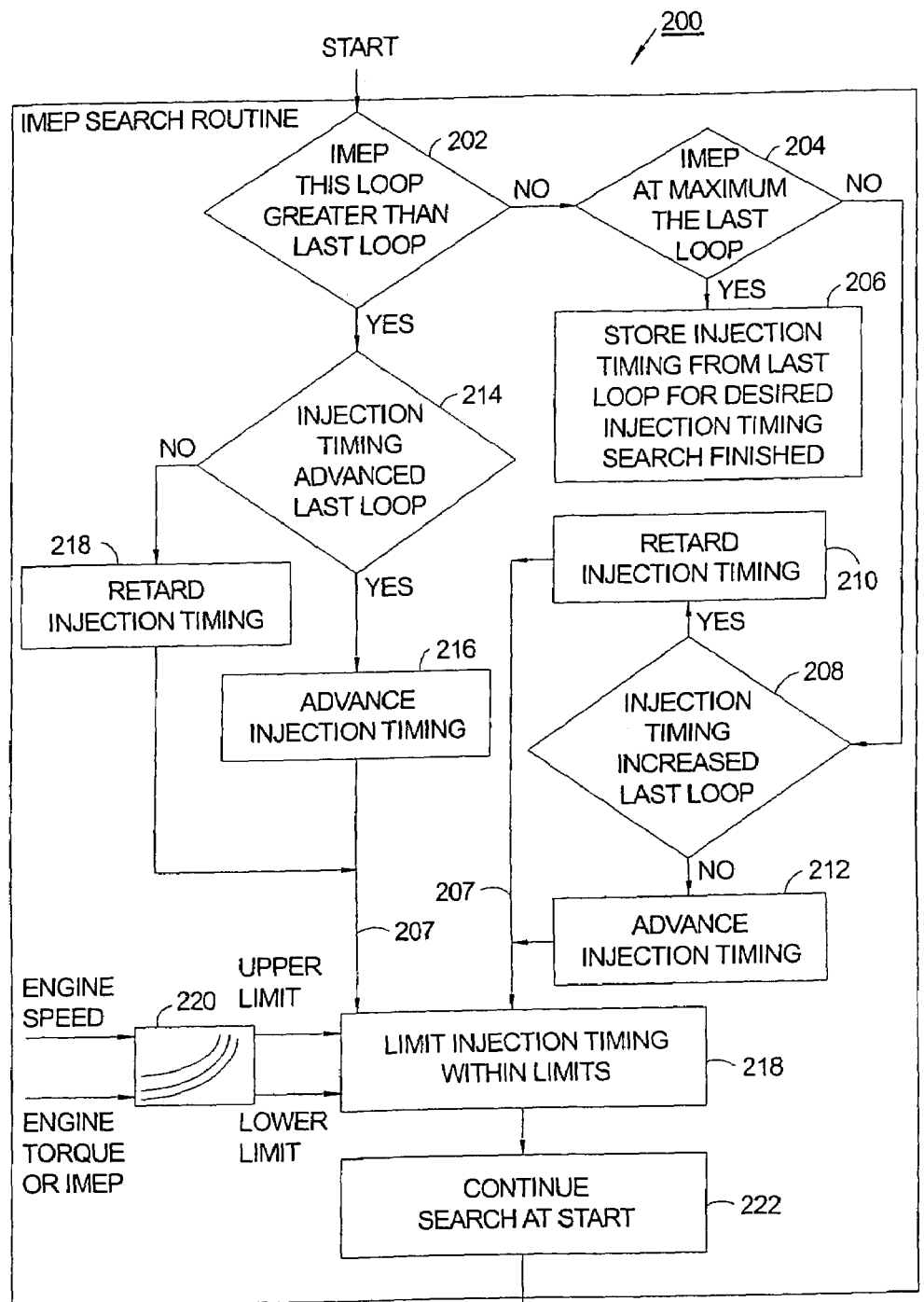
FIG. 4 is an IMEP search routine for optimizing fuel injection timing to maximize fuel efficiency of a CI engine at steady state operation.

Referring to FIG. 4, IMEP search routine algorithm 200 proceeds as follows. If the new IMEP value 202 is not greater than the previous value, is the previous value at a reference maximum 204 (item 12, FIG. 1)? If so, that value is stored and used, and the search is finished 206. If the new value is not a maximum value 12, was the injection timing angle increased in the last loop 208? If so, then the injection timing is retarded by a predetermined amount 210; if not, then the injection timing is advanced by a predetermined amount 212.

Alternatively, if the new IMEP value 202 is greater than the previous value, was the injection timing angle advanced in the last loop 214? If so, then the injection timing is again advanced by a predetermined amount 216; if not, then the injection timing is retarded by a predetermined amount 218.

Unless the IMEP has been found to be already maximized 204 and the search finished 206, an instruction 207 is issued to either advance or retard the next fuel injection timing, provided that the intake manifold oxygen percentage is still within predetermined limits 218 as may be calculated for lookup tables 220 for engine speed and/or torque, as shown in FIG. 2. The loop is now finished 222 and a new search loop 100/200 is begun. As long as the steady state conditions of search 100 are satisfied, the ECM will iterate through routine 200 until the IMEP from the last loop 204 is the maximum and the associated fuel injection timing angle is stored and used 206.

Thus, the method of the present invention acts to find and employ maximum IMEP value 12, indicative of the optimal fuel injection timing angle for the steady state engine conditions previously determined, thus maximizing engine torque and fuel efficiency for each cylinder.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for optimizing fuel injection timing angle in a compression ignited engine to provide maximum engine torque, comprising the steps of:
   a) determining a reference value for the highest indicated mean effective pressure during the piston power stroke in a cylinder of said engine at a first fuel injection timing angle;
   b) varying the fuel injection timing angle in a successive engine firing;
   c) determining a successive value for highest indicated mean effective pressure;
   d) comparing said successive value to said reference value to determine if said successive value is greater;
   e) repeating steps b through d until said successive value is not greater than an immediately preceding value, wherein said immediately preceding value is defined as a maximum indicated mean effective pressure; and
   f) operating said engine at said fuel injection timing angle that provides said maximum indicated mean effective pressure.

2. A method in accordance with claim 1 wherein said engine is determined to be in a steady state condition before executing the steps of claim 1.

3. A method in accordance with claim 2 wherein said steady state condition is defined by engine operating parameters being within specified limits, and wherein at least one of said engine operating parameters is selected from the group consisting of engine speed, fueling rate, mass air flow rate, intake manifold oxygen level, manifold absolute pressure, and intake mixture temperature.

4. A method in accordance with claim 1 wherein said steps a through d are repeated in an iterative loop during each firing cycle of said engine.

5. A method in accordance with claim 1 wherein said engine is a multiple cylinder engine and wherein each cylinder is provided with means for determining indicated mean effective pressure in said cylinder and wherein steps (a) through (f) are performed for each of said cylinders.

* * * * *